B. B. MILNER.
METHOD OF MANUFACTURING CORRUGATED METAL PLATES.
APPLICATION FILED SEPT. 5, 1919.
1,425,208.
Patented Aug. 8, 1922.
3 SHEETS—SHEET 1.
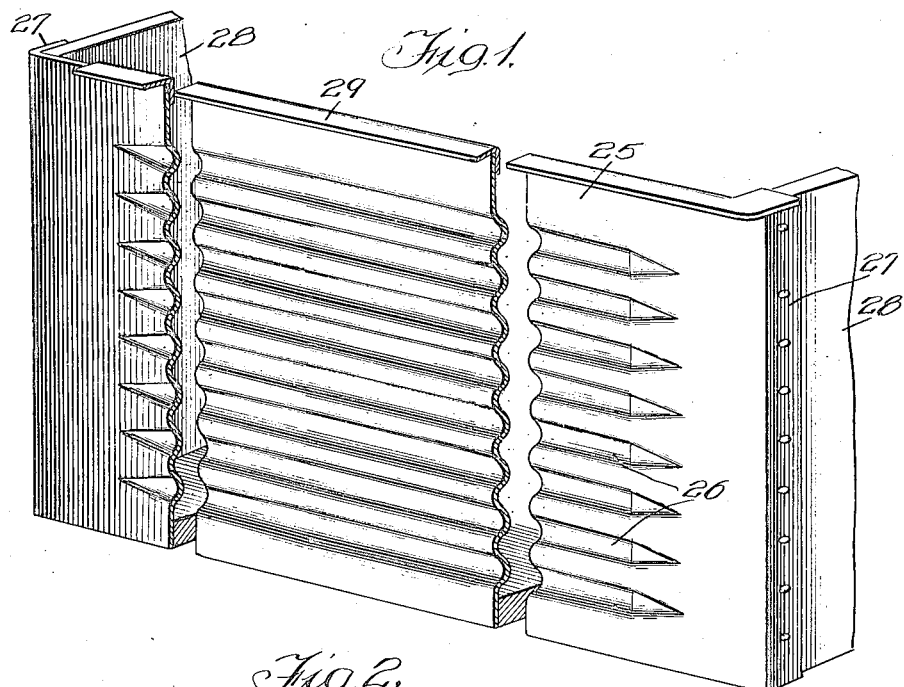
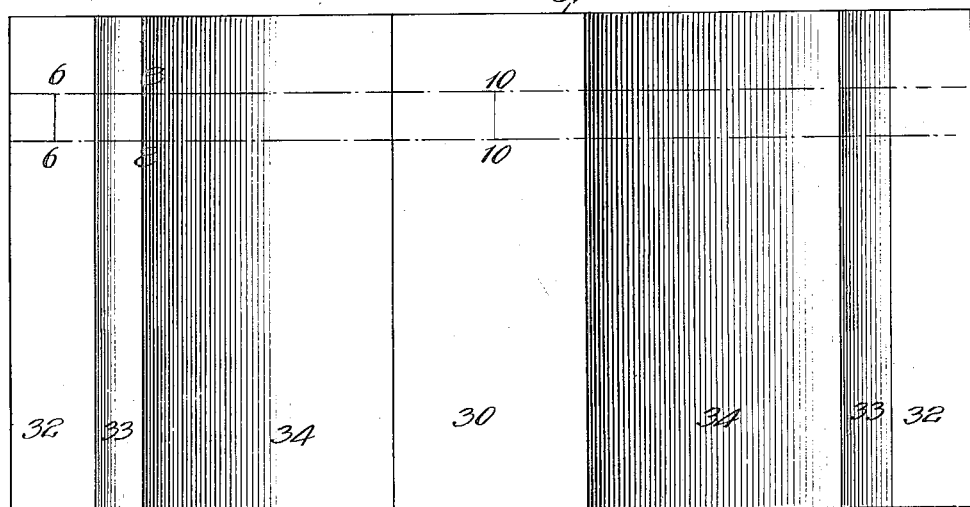
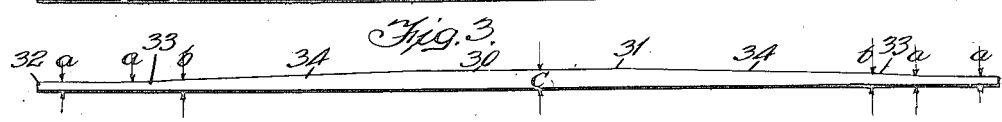

B. B. MILNER.
METHOD OF MANUFACTURING CORRUGATED METAL PLATES.
APPLICATION FILED SEPT. 5, 1919.
1,425,208.
Patented Aug. 8, 1922.
3 SHEETS—SHEET 2.
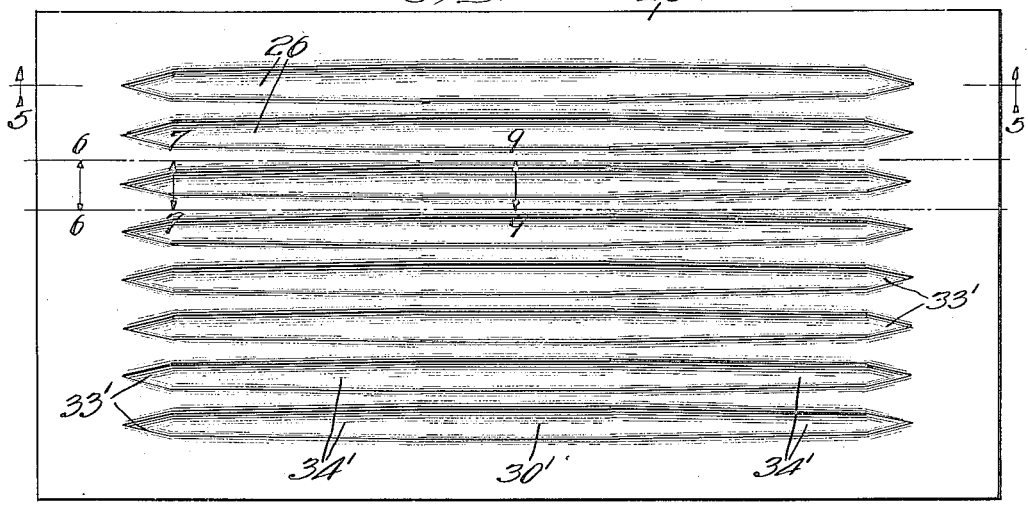
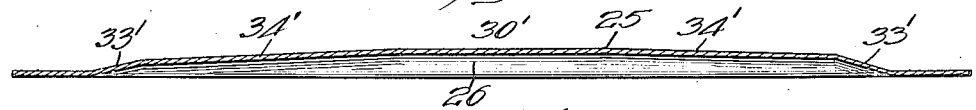
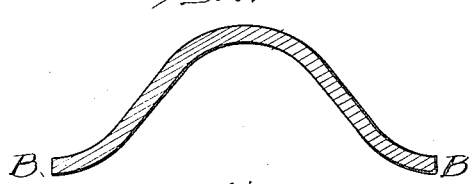
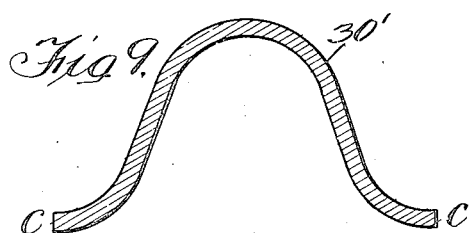
Witnesses:
W. F. Kilroy
Harry R. Prichit
Inventor:
Bert B. Milner
By Barnett Brennan
Attys.

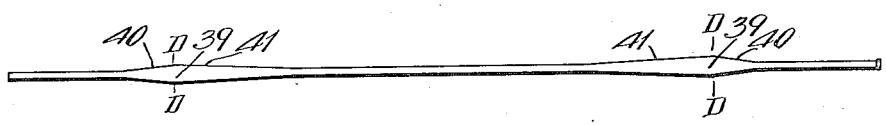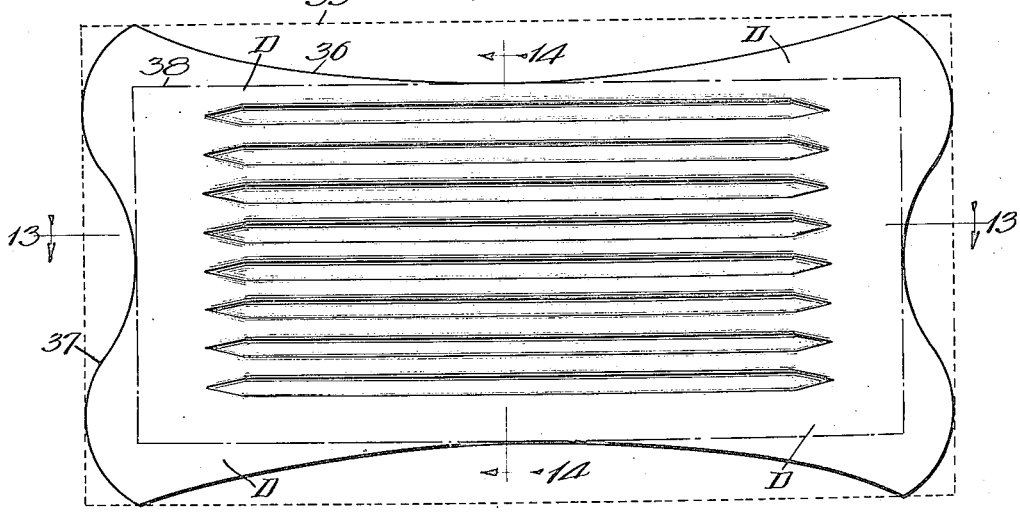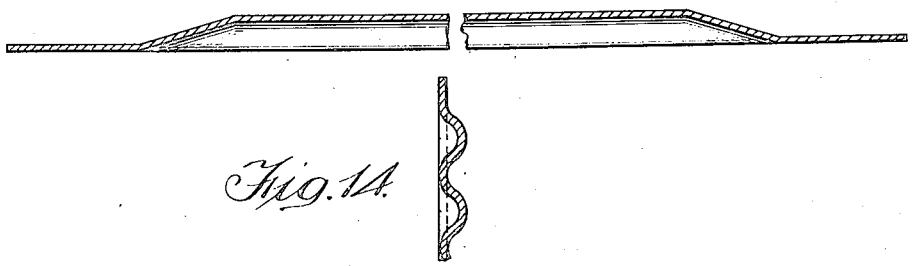

UNITED STATES PATENT OFFICE.

BERT B. MILNER, OF NEW YORK, N. Y.

METHOD OF MANUFACTURING CORRUGATED METAL PLATES.

1,425,208.  Specification of Letters Patent.  Patented Aug. 8, 1922.

Original application filed April 29, 1919, Serial No. 293,462. Divided and this application filed September 5, 1919. Serial No. 321,915.

*To all whom it may concern:*

Be it known that I, BERT B. MILNER, a citizen of the United States, residing at New York, in the county of New York and State of New York, have invented certain new and useful Improvements in Methods of Manufacturing Corrugated Metal Plates, of which the following is a specification.

My invention relates to the manufacture by pressing of metal plates or other metal articles formed with corrugations, ribs, embossments, channels or other configurations necessitating the stretching or thinning of the metal during the pressing operation. The primary object of the invention is to compensate for the unequal stretching or thinning of the metal at different places under conditions imposed by the pressing operation by making the original plate or blank thicker in the regions where the stretching or thinning is greatest. The invention is applicable to the manufacture of metal articles of various different sorts but for purpose of illustration will be shown and described in connection with the manufacture of corrugated plates suitable for use as end wall plates of railway cars.

In the drawings—

Fig. 1 shows the application to a railway car of a corrugated plate manufactured in accordance with my invention, this figure being a broken perspective view of the end of a railway car employing a corrugated end sheet manufactured in accordance with my invention.

Fig. 2 is a plan view of the plate before it is corrugated.

Fig. 3 is an end view of the plate to show the variation in thickness which, for purposes of illustration, has been exaggerated.

Fig. 4 is a somewhat diagrammatic view of the face of the finished plate.

Fig. 5 is a sectional view on line 5—5 of Fig. 4.

Figs. 6 to 10 inclusive are diagrams which may be located on Figs. 2 and 4 as follows: Fig. 6 on line 6—6 of Figs. 2 and 4; Fig. 7 on line 7—7 of Fig. 4; Fig. 8 on line 8—8 of Fig. 2; Fig. 9 on line 9—9 of Fig. 4 and Fig. 10 on line 10—10 of Fig. 2.

Figs. 11 to 14 inclusive, are diagrammatic views illustrating a modified form of plate and method of manufacture; Fig. 11 being an edge view of the plate, before corrugating, along the edge parallel to the lines of the intended corrugations; Fig. 12, a view of the face of the plate, the dotted outline indicating the plate before corrugating, the full line the plate after it has been corrugated, and the dot and dash line the plate after being trimmed to rectilinear shape; Fig. 13, being a section on line 13—13 of Fig. 12, and Fig. 14, a section on line 14—14 of Fig. 12.

Like characters of reference designate like parts in the several figures of the drawings.

I shall first describe the plate and method of manufacturing the same illustrated in Figs. 1 to 10 inclusive. The finished plate 25 here shown is formed with a plurality of substantially parallel corrugations 26 which, to all intents and purposes, merge one into the other so that the corrugated portion of the plate has a sinuous configuration as shown in Fig. 1. In this figure the finished plate forms the end sheet of a gondola car, the vertical edges of the plate being flanged over at 27 and attached to the side walls 28 of the car. The upper edge of the sheet is provided with an angular top chord 29. The portion 30 of the uncorrugated plate 31 (Figs. 2 and 3) is thicker than the rest of the plate. This thickness is indicated by the letter $c$. The marginal portions 32 of the plate are the thinnest portions, the thickness being indicated by $a$. The portions 33 adjacent the marginal portions increase in thickness from the thickness $a$ of the margins to a thickness indicated by $b$. The portions 34, 34 of the plate intervening between those designated 33 and 30 have a thickness which varies from $b$ to $c$.

A plate so formed, by rolling, for example, through rolls of suitable contour, is heated to red heat and pressed between dies having a configuration proper to form in said plate corrugations of the character indicated in Figs. 4, 5, 7 and 9, that is to say, each corrugation will have terminal portions 33', a center portion 30', the contour of which is shown in Fig. 9, and intervening portion 34, the contour of which will vary from that shown in Fig. 7 to that shown in Fig. 9. Where a finished plate is desired which will be of substantially uniform thickness on all places the thickness of the blank before being corrugated along any given line transverse to the intended corrugations is to be proportionate, in accordance with my invention, to the amount of stretch of the metal along such line when the plate is subjected to pressure in the operation forming the corrugations. When the plate is rolled or otherwise formed to give it the varying thicknesses above indicated, the operation of developing the corrugations will thin the plate at the thicker portions so as to reduce it to substantially the same thickness throughout, namely, to the thickness of the marginal portions 32. Assuming that during the pressing operation the edges of the plate are restrained so that they will not draw in, the thickness of the plate along different transverse lines is to be determined with reference to the corrugation contours, as follows: Let A represent the distance between corrugation center lines and $a$, as above stated, the thickness of the marginal portions of the plate or of the finished plate at any point. Let B represent the length of the contour line of a corrugation from center line to center line, on line 7—7 of Fig. 4, that is, along the line between portions 33' and 34' of any corrugation, $b$ being the thickness of the original plate along this same line. Let C represent the length of the contour line of the corrugation, between center lines, on line 9—9 of Fig. 4, that is, through the portion of the corrugation designated 30'; $c$ being the thickness of the original plate on a corresponding line. The original plate should be so proportioned that A will be to $a$ as B is to $b$ and C to $c$. Working this out for a corrugated plate a quarter of an inch thick, a standard thickness for railway car ends, $a$ will be one quarter of an inch, $b$ .30725 and $c$ .38025 or approximately so. This will give a corrugation, the middle portion of which will have a cross sectional configuration such as shown in Fig. 9, as against a cross sectional configuration adjacent the pointed terminals represented by Fig. 7. In corrugating a railway car end sheet intended to extend across the car from side to side and formed from a plate a quarter of an inch thick, it is difficult to press the corrugations more than approximately two inches deep with center lines six inches apart. Fig. 7 represents this depth of corrugation. By making the sheet thicker at the middle it is possible to obtain a corrugation having a depth at the middle of the car indicated by Fig. 9 without making the center of the plate any thinner than the other portions. The additional depth of the corrugations at the middle of the car gives the end increased strength and rigidity inasmuch as the corrugations function as beams, particularly where one merges into the other so that one corrugation cannot deflect without producing some deflection in the adjacent corrugations.

The above proportional dimensions are based upon the assumption that the plate, when being pressed, will not draw in at the edges. If the plate does draw in to any appreciable extent, it will be necessary, in order to get uniform thickness in the finished sheet, to take this factor into account in determining the thickness of the original plate along different transverse lines. This solution will be apparent from the following description of the modified method illustrated in Figs. 11 to 14 of the drawings hereof.

According to this method, a sheet is provided in which the corrugations are of uniform cross sectional area throughout their length (except at their terminals), the expedient of making the original plate thicker at certain places than at others being, in this case, to compensate for the difference in stretch due to the inversely proportioned draw in of the edges, this method contemplating a pressing operation in which the edges of the plate are free to draw in when the plate is acted upon by the dies. Referring to Fig. 12, the dotted outline 35 indicates the outline of the original plate. The full lines 36, 37 form the outline of the plate after the corrugations have been pressed into the same. The dash and dot line 38 indicates the finished plate after having been sheared to rectangular shape. As shown by lines 36, the edges of the plate parallel to the corrugations will pull in the most at the middle. The stretch of the metal will necessarily have to be greatest along the lines D, D intersecting the corrugations at the places where they start to taper, because while the pull in of the metal continues to decrease from these lines outwardly to the ends of the sheet the transverse contour lines of the corrugations also diminish because of the tapering of the corrugations. The original plate is made thickest along the lines D, D, as indicated at 39, Fig. 11. The thickness of the plate along the lines D, D, and the slope of the surfaces 40, 41 on opposite sides of these lines, will be proportioned to the stretch of the metal at these places. This can be determined empirically. As a result of giving the plate this configuration, which can be accomplished in rolling, the finished corrugated sheet can be made of substantially uniform thickness throughout, where this is desirable, whereas under present practice there has always been a tendency to thin the metal along the lines of the junction between the main portions of the corrugations and their pointed terminals.

This application is a division of my copending application Serial No. 293,462 filed April 29, 1919, in which is claimed the corrugated plate formed by the method herein described and claimed.

I claim:

1. Improvement in the method of manufacturing a plate having pressed therein corrugations that terminate within the edges of the plate, which consists in forming the plate so that the marginal portions beyond the ends of the intended corrugations are of uniform and minimum thickness and so that the thickness of the plate between said marginal portions will vary in accordance with the amount of stretch to which the plate at different places is to be subjected in pressing the corrugations, and subjecting the plate so formed to pressure which develops the corrugations and reduces the plate to substantially the same thickness throughout the corrugated and marginal portions thereof.

2. Improvement in the method of manufacturing a plate having pressed therein corrugations that have a maximum cross sectional area for a substantial part of their length at the middle and taper toward the extremities, which consists in forming the plate so that it has a maximum thickness at the middle for a distance corresponding to the length of the portions of the intended corrugations, of maximum cross sectional area and tapers in thickness toward the ends of the plate, and subjecting the plate so formed to pressure which develops corrugations of the contour aforesaid and reduces the plate to substantially the same thickness throughout the corrugated portion thereof.

3. Method of forming a plate with parallel corrugations that terminate within the edges of the sheet, which consists in making the plate thicker along transverse lines adjacent the intended extremities of the corrugations, and subjecting the plate to pressure between dies which press out the corrugations while allowing the edges of the plate to draw in.

4. Method of forming a plate with parallel corrugations which have tapered terminal portions and flat margins beyond the ends of the corrugations which consists in making the plate with the portions to form the margins of substantially uniform and minimum thickness and with the portions from which the terminals of the corrugations are pressed of thicker metal, and pressing the plates so formed, while hot, between dies to form the corrugations and give the corrugated portion of the plate a thickness substantially equal throughout to the thickness of the margins.

BERT B. MILNER.